United States Patent [19]

Rogers et al.

[11] Patent Number: 4,575,547
[45] Date of Patent: Mar. 11, 1986

[54] LOW-MELTING AROMATIC POLYESTERS OF TRIFLUOROMETHYL TEREPHTHALIC ACID OR ESTER FORMING DERIVATIVES THEREOF

[75] Inventors: Howard G. Rogers, Weston, Mass.; Russell A. Gaudiana, Merrimack, N.H.; Richard A. Minns; Roger F. Sinta, both of Arlington, Mass.

[73] Assignee: Polaroid Corporation, Cambridge, Mass.

[21] Appl. No.: 674,775

[22] Filed: Nov. 26, 1984

[51] Int. Cl.⁴ .............................................. C08G 63/68
[52] U.S. Cl. .................................... 528/191; 528/193; 528/194; 560/83; 562/480; 260/543 R
[58] Field of Search ....................... 528/191, 193, 194

[56] References Cited

U.S. PATENT DOCUMENTS

| | | | |
|---|---|---|---|
| 3,008,929 | 11/1961 | Wielicki et al. | 260/75 |
| 3,160,603 | 12/1964 | Holub et al. | 528/191 |
| 3,256,242 | 6/1966 | Morgan | 528/191 |
| 3,786,022 | 1/1974 | Hata et al. | 260/47 |
| 4,066,620 | 1/1978 | Klienschuster et al. | 260/47 |
| 4,083,829 | 4/1978 | Calundann et al. | 260/47 |
| 4,183,895 | 1/1980 | Luise | 528/191 |
| 4,238,600 | 12/1980 | Jackson, Jr. et al. | 528/193 |
| 4,288,588 | 9/1981 | Donohue | 528/348 |
| 4,381,391 | 4/1983 | Chen | 528/191 |
| 4,433,132 | 2/1984 | Rogers et al. | 528/191 |

Primary Examiner—Lester L. Lee
Attorney, Agent, or Firm—Louis G. Xiarhos

[57] ABSTRACT

Aromatic polyesters exhibiting melt processability are disclosed. The polyesters comprise repeating units of the formula

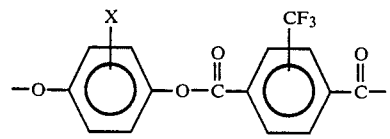

wherein X is hydrogen, halogen, alkyl or nitro. The polyesters exhibit low-melting properties, melt processability and melt anisotropy. The aromatic polyesters can be melt processed to films and fibers.

16 Claims, No Drawings

LOW-MELTING AROMATIC POLYESTERS OF TRIFLUOROMETHYL TEREPHTHALIC ACID OR ESTER FORMING DERIVATIVES THEREOF

BACKGROUND OF THE INVENTION

This invention relates to aromatic polyesters useful in the production of films and fibers. More particularly, it relates to aromatic polyesters exhibiting desirable low-melting and melt-processable characteristics.

The production of polyesters, including aromatic polyesters, by the polycondensation of dicarboxylic acids (or the corresponding acyl halides) and polyhydric alcohols has been well known. For example, the production of polyesters is described in U.S. Pat. No. 3,008,929 (issued Nov. 14, 1961 to E. A. Wielicki); in U.S. Pat. No. 3,786,022 (issued Jan. 15, 1974 to N. Hata et al.); in U.S. Pat. No. 4,066,620 (issued Jan. 3, 1978 to J. J. Kleinschuster); in U.S. Pat. No. 4,083,829 (issued Apr. 11, 1978 to G. W. Calundann et al.); in U.S. Pat. No. 4,288,588 (issued Sept. 8, 1981 to J. A. Donohue); and in U.S. Pat. No. 4,433,132 (issued Feb. 21, 1984 to H. G. Rogers et al.). In general, it is well recognized that the mechanical and physical properties of polymeric films and fibers will depend upon the chemical structure of the polymers from which they are prepared and that such properties can be materially influenced by such molecular factors as chain stiffness, intermolecular forces, orientation and crystallinity. Accordingly, there has been considerable interest in the development of polyesters having particular structural or molecular configurations for the realization of one or more particular properties suited to a desired application.

In the production of polyester films and fibers, it will generally be advantageous to prepare such films and fibers either from a solution of the polyester in a common and readily available solvent or from a processable melt of the polyester material. Frequently, and particularly in the case of wholly aromatic polyesters, the polyester material may be substantially insoluble; and when the polyester can be suitably dissolved and processed from a solvent material, film and fiber production will require the handling and recovery of the solvent material. Moreover, melt processability is frequently hampered by the tendency of the polyester materials to be melt processable only at elevated temperatures which, in some instances, may approach the onset of thermal degradation. It will be appreciated that the characteristic and advantageous properties of a polyester suited to a particular application will be more readily realized where the polyester material exhibits low-melting behavior and can be melt processed into films and fibers at relatively low processing temperatures.

SUMMARY OF THE INVENTION

The present invention provides a class of low-melting, melt-processable polyesters comprising the following formula (I) repeating units:

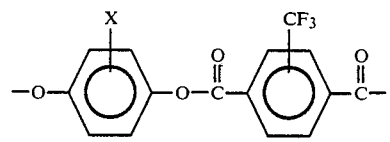

wherein X is hydrogen, halogen, alkyl (e.g., methyl) or nitro. It has been found that polyesters including the formula (I) repeating units exhibit a low-melting character that facilitates low-temperature melt processability. Films and fibers which exhibit certain desired optical properties, e.g., birefringence, can be provided from the melt-processable polyester material.

According to the present invention, there is provided a polyester comprising repeating units of the following formula:

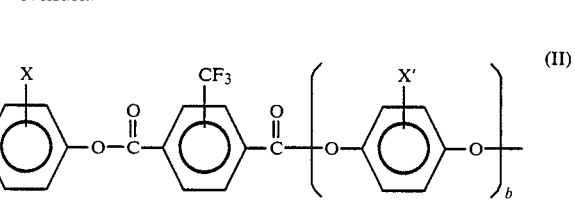

wherein
X is hydrogen, halogen (e.g., chloro, bromo iodo), alkyl (e.g., methyl, ethyl) or nitro;
Y is hydrogen, halogen (e.g., chloro, bromo iodo), alkyl (e.g., methyl, ethyl) or nitro;
X' is hydrogen, halogen (e.g., chloro, bromo iodo), alkyl (e.g., methyl, ethyl) or nitro, except that X' is different from X;
and each of a and b is zero or one.

DETAILED DESCRIPTION OF THE INVENTION

It will be seen from inspection of the aforedescribed formula (II) repeating unit that the polyesters of the invention contain as an essential part thereof the formula (I) repeating group shown hereinbefore, i.e.,

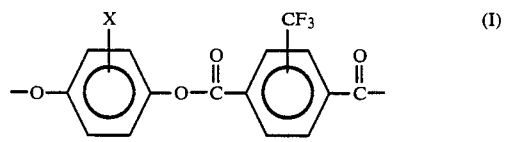

and certain optional repeating groups having the formulas (III) and (IV):

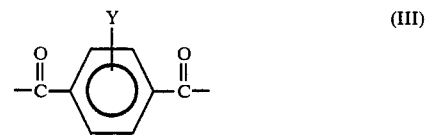

and

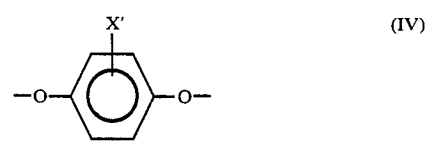

wherein X, X' and Y have the meanings as previously described.

The formula (I) repeating group

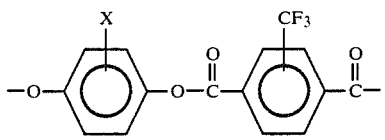

can be derived by the polycondensation of 2-trifluoromethylterephthaloyl chloride (or the corresponding acid or an alkyl ester thereof) and a dihydric quinone compound of the formula (V)

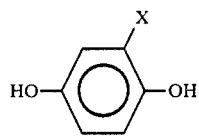

wherein X is as previously defined. It has been found that the presence of the trifluoromethyl substituent contributes importantly to the provision of polyesters which exhibit a marked reduction in melting temperature. The X substituent can be hydrogen, but will preferably be halogen (e.g., chloro), alkyl (e.g., methyl) or nitro for further contribution to the realization of a low-melting and melt-processable polyester. A preferred polyester of the invention is the condensation polyester of 2-trifluoromethylterephthaloyl chloride and chlorohydroquinone.

If desired, a difunctional acid halide (or an acid or ester thereof) other than the 2-trifluoromethylterephthaloyl halide can be included therewith in the reaction with the hydroquinone compound (or a mixture of different hydroquinones) for the production of random copolyesters having repeating units of formula (II) containing formula (III) and/or formula (IV) repeating groups. An example of such a polyester is a polyester comprising repeating units of the following formula (IIa):

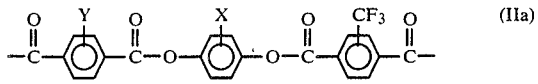

wherein X and Y are as previously defined and preferably are chloro and hydrogen, respectively. It will be seen that the formula (IIa) repeating units are the result of "a" being one and "b" being zero in the formula (II) repeating unit.

Another preferred polyester of the invention is comprised of repeating units of the following formula (IIb), which is the result of "a" in the formula (II) repeating unit being zero and "b" being one

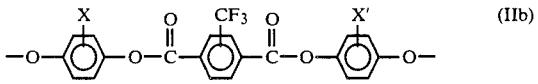

In the formula (IIb) repeating unit, X and X' are dissimilar substituents and, thus, a random copolymer of repeating formula (IIb) units has a different structure than a polymer comprised of only formula (I) units.

Polyesters of the invention can also be prepared from a mixture of difunctional acids and a mixture of hydroquinone compounds. An example of such a polyester is a copolyester having the following formula (IIab), corresponding to the formula (II) copolyester repeating unit wherein each of "a" and "b" is one:

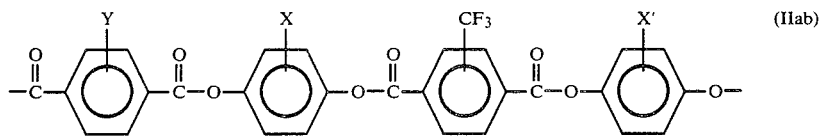

and X, X' and Y have the meaning previously described. It will be appreciated that in a random copolyester having repeating formula (IIab) units, there will also be present repeating units wherein the respective acid-derived and hydroquinone-derived radicals will be linked in alternative arrangements.

Inclusive of polyesters of the present invention are the polyesters represented by the following repeating units wherein the indicated subscripts represent the molar proportion of each of the respective radicals in the polyester.

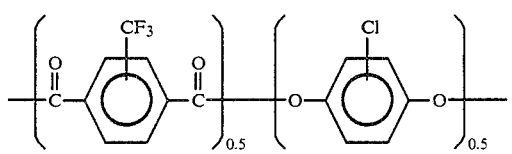

(VI)

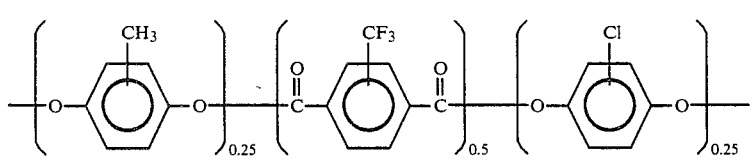

(VII)

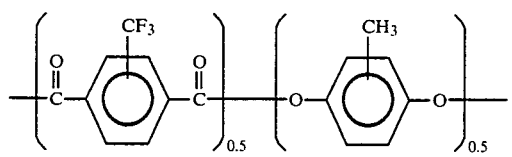
(VIII)

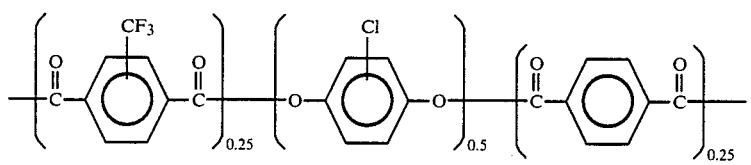
(IX)

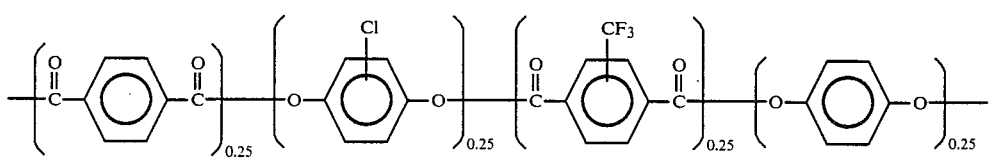
(X)

While the polyesters of the invention can consist essentially of repeating units represented by the formula (II) radical, i.e.

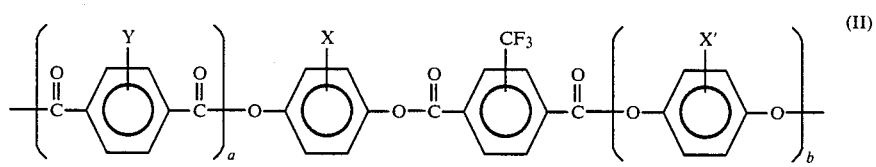
(II)

wherein X, X', Y, a and b are as previously defined, the polyesters can also include repeating units which do not conform to formula (II) radicals and which do not have a deleterious affect on the low-melting properties of the polyester. Examples of repeating units which do not conform to such descriptions and which can be present in the polyester in amounts which do not adversely influence low-melting character include repeating units having the formula (XI) structure $$-\overset{O}{\underset{\|}{C}}-G-\overset{O}{\underset{\|}{C}}-O-G'-O- \qquad (XI)$$

wherein, for example, at least one of divalent radicals G and G' represents an aliphatic radical or an aromatic radical other than as defined in the formula (II) radicals hereof. Thus, in the formula (XI) repeating units, G and G' can be 1,2-ethylene; 1,2-propylene; 1,3-propylene; 1,4-phenylene; 1,3-phenylene; 4,4'-biphenylene; the stilbene radical of the formula

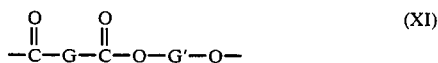

corresponding substituted stilbene radicals; substituted or unsubstituted biphenylene radicals interbonded through methylene, ether, sulfone, sulfide or like group; trans-vinylene; ethynlene; 2,4'-trans-vinylenephenylene; and polyunsaturated divalent radicals such as trans,trans-1,4-butadienylene and 1,4-dimethyl-trans,-trans-1,4-butadienylene.

It will be appreciated that the nature of the radicals which are incorporated into the polyesters hereof, including the formula (II) units and any formula (XI) repeating units that may be present, will affect the properties observed in the polyester material. Where the polyester material is desirably employed as a birefringent layer in an optical device, it will be preferred that any formula (IX) repeating units that detract from a rigid rod-like character in the polyester be minimized or avoided. The formula (II) radicals contain essentially coaxial chain-extending bonds that are suited to the provision of a rigid rod-like character. For example, aromatic radicals having para-oriented chain-extending bonds will be preferred where a rigid rod-like polymer exhibiting highly birefringent behavior in oriented films or fibers is desired.

Those of the formula (IX) units having a flexible character, such as alkylene radicals and biphenylene radicals interbonded through methylene, ether, sulfone, sulfide or the like, and phenylene radicals having ortho- or meta-oriented bonds, should be avoided where a birefringent polymer is desired, but can be included in the polyester for predetermined modification of the properties of the polyester material. The inclusion of such units, in conjunction with the formula (II) units, can, for example, be employed for further reduction in the melting temperature of the polyester.

The polyesters of the present invention can be prepared by a solution polycondensation or melt polycondensation reaction depending upon the melting point or solubility of the particular reactants employed. In general, the polyesters can be prepared by reaction of a dicarboxylic acid or mixture of dicarboxylic acids (or corresponding acid halides or alkyl esters) with a polyhydric alcohol or mixture of such alcohols, according to known polycondensation methods.

In the case, for example, of a solution polycondensation reaction, the polyester can be obtained by reaction of the diacid halide(s) with the polyhydric alcohol(s) in a suitable inert organic solvent, and in the presence of a catalyst (or acid acceptor) which neutralizes hydrogen chloride formed, e.g., pyridine.

An inert organic solvent is utilized to dissolve the polyester produced by the polycondensation reaction. Suitable solvents include chloroform, methylene chloride, 1,2-dichloroethane, 1,1,2,2-tetrachloroethane, dimethylsulfoxide, N,N-dimethylformamide and acetone. In general, the polyester is obtained by reaction of one mole of the polyhydric alcohol with 1.0 to 1.05 moles of the diacid halide(s) in the organic solvent and in the presence of at least two moles of the acid acceptor. The polycondensation can be conducted at a temperature of about 20° C. to about 150° C. or higher depending upon the boiling point of the solvent. Suitable acid acceptors include the tertiary amines, such as the trialkyl amines, e.g., triethylamine; or heterocyclic amines, e.g., pyridine.

The polyesters hereof can also be prepared by a known melt polycondensation technique involving the reaction of one mole of a diacetate of the polyhydric alcohol(s) and 1.0 to 1.1 moles of the dicarboxylic acid(s), in the presence of a catalyst. The reaction mixture is heated in a stream of inert gas, e.g., nitrogen, to a reaction temperature between the melting temperature and the decomposition temperature of the monomers and the reaction pressure is reduced to below about 60 mm. Hg for removal of acetic acid produced by the reaction. Further heating above the melting temperature of the polyester product and reduction of the reaction pressure to below about 5 mm Hg results in additional removal of acetic acid by-product. Organometallic compounds such as titanium dioxide, antimony trioxide and butyl orthotitanate can be suitably employed as catalysts for the melt polycondensation reaction.

Polyesters of the present invention can also be prepared by ester interchange according to generally known procedure. Thus, one mole of dialkyl ester of the dicarboxylic acid(s) can be reacted with from about 1.1 to about 2.5 moles of polyhydric alcohol generally at atmospheric pressure, although subatmospheric or superatmospheric conditions can be employed. Suitable catalysts for the ester interchange reaction, which is generally conducted over a range of from about 90° C. to 325° C., include calcium acetate, sodium methoxide, antimony trioxide and tetraisopropyl titanate. During the ester interchange reaction, an alcohol is removed as a by-product and heating is continued to effect the polycondensation.

The preparation of a preferred low-melting polyester of the invention can be illustrated by the following reaction scheme which shows the polycondensation of 2-trifluoromethylterephthaloyl chloride and chlorohydroquinone in 1,1,2,2-tetrachloroethane (TCE) solvent using pyridine as an acid acceptor:

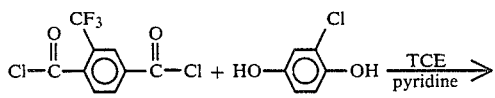

-continued

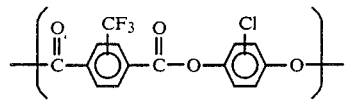

The polyesters of the present invention can be conveniently prepared from known monomeric compounds. For example, the 2-trifluoromethyl-1,4-phenylene dicarbonyl chloride shown in above reaction scheme can be prepared according to the procedure of Kan Inukai and Yasuo Maki, Kogyo Kagak Zasshi, 68(2), 315 (1965). Alternatively, the compound can be prepared according to the procedure described in Example 1 hereof.

The polyesters of the present invention are especially advantageous from the standpoint of their processability at lower temperatures, e.g., in the range of about 115° C. to 205° C. The improved melt processability of the polyesters of the invention, relative to aromatic polyesters in general, which are only melt processable at higher temperatures, permits improved handling of the polymers and allows for production of polymeric layers without the requirements of solvent handling and recovery. Films and fibers or other shaped forms of the polyesters can be redissolved and reshaped or refabricated if desired. Depending upon the nature of other recurring units as may be present in the polyester materials, the melt-processing characteristics of the polyesters hereof can be varied or controlled to suit particular applications.

The polyesters of the present invention can be variously formed or shaped into films, sheets, coatings, layers, fibrils, fibers or the like. Melt-casting, injection-molding and like forming or shaping techniques can be used for this purpose. If desired, for example, a melt of the polyester can be cast onto a suitable support material for the formation of a polymeric film or layer of the polyester material. The polymeric film can be subjected to stretching so as to introduce molecular orientation and provide a film material having a birefringent character. If desired, the polyesters can be formed into fibers, fibrils or the like by melt extrusion methods known in the art. For example, a melt of the polyester can be extruded into the form of fibers which can be cut, stretched or assembled into fiber tows or bundles as desired.

Where a molecular orientation is permanently induced in the polyester material, as by formation of the polyester into a oriented sheet, fiber or other form, the polyester will exhibit optical birefringence which can be measured in accordance with a number of known methods. Known shaping or forming methods can be utiized to induce such orientation. Preferably, this will be accomplished by unidirectional stretching of a polymeric film, by extrusion of the polymer into a sheet, fiber or other stretched form, or by the combined effects of extrusion and stretching. In general, greater birefringence will be observed in the case of polymeric materials exhibiting a greater degree of molecular orientation.

The polyesters of the present invention can be utilized in the construction of a variety of optical filter or other devices. Optical devices in which the polyesters of the invention can be utilized, and their method for construction and modes of operation are described in detail in U.S. Pat. No. 4,446,305 to H. G. Rogers et al., issued May 1, 1984. Examples of other devices which can be adapted to include a polymeric and birefringent layer as described herein are described, for example, in U.S. Pat. No. 3,506,333 (issued Apr. 14, 1970 to E. H. Land); in U.S. Pat. No. 3,213,753 (issued Oct. 26, 1965 to H. G. Rogers); in U.S. Pat. No. 3,610,729 (issued Oct. 5, 1971 to H. G. Rogers); in U.S. Pat. No. 3,473,013 (issued Oct. 14, 1969 to H. G. Rogers); in U.S. Pat. No. 3,522,984 (issued Aug. 4, 1970 to H. G. Rogers); in U.S. Pat. No. 3,522,985 (issued Aug. 4, 1970 to G. H. Rogers); in U.S. Pat. No. 3,528,723 (issued Sept. 15, 1970 to H. G. Rogers); and in U.S. Pat. No. 3,582,424 (issued June 1, 1971 to K. Norvaisa).

The present invention can be illustrated by the following Examples which are intended to be illustrative and not limitative.

EXAMPLE 1

This example illustrates the preparation of 2-trifluoromethylterephthaloyl chloride.

Part A—Preparation of 1,4-dimethyl-2-trifluoromethyl-terephthalate:

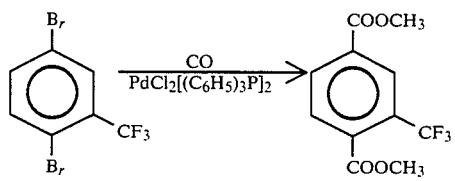

A Parr bomb was charged with 2,5-dibromo-benzotrifluoride (6.0 g; $2 \times 10^{-2}$ mole), dichlorobis(triphenylphosphine) palladium (II) (0.14 g; $2 \times 10^{-4}$ mole), triethylamine (7.0 ml; $5 \times 10^{-2}$ mole), and methanol (50 mls.). The bomb was then pressurized with 500 psi of carbon monoxide, placed in an oil bath and heated to 110° C. with stirring. After 48 hours, the bomb was cooled, and vented, and the reaction mixture was diluted with 50 mls. of water. The solution was then extracted with pentane (three times, 50 mls. each). The pentane was then washed once with water, dried over MgSO$_4$, filtered, and evaporated. The resulting oil was flash chromatographed on silica gel with hexane/methylene chloride (1:1, v/v), yielding the product as a light, amber oil (3.10 g; 59%). The assigned structure was confirmed by nuclear magnetic resonance, infrared and mass spectrophotomeric analytical techniques. Elemental analysis provided the following results.

|     | Calculated | Found |
| --- | --- | --- |
| %C | 50.39 | 50.50 |
| H | 3.46 | 3.27 |
| F | 21.74 | 21.49 |

Part B—Preparation of 2-trifluoromethylterephthalic acid:

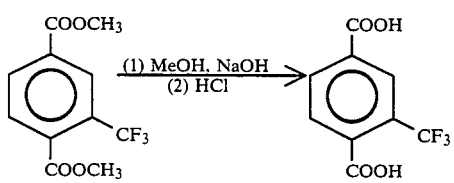

A mixture of 1,4-dimethyl-2-trifluoromethylterephthalate (2.60 g; $9.90 \times 10^{-3}$ mole), sodium hydroxide (3.80 g; $9.5 \times 10^{-2}$ mole) and 30 mls. of methanol was stirred and refluxed until the sodium salt of the acid precipitated. The methanol was then distilled off while adding water, in order to maintain a homogeneous solution. When all of the methanol was removed (at a distillation temperature of 90° C.), the solution was cooled and acidified with concentrated hydrochloric acid. The resulting white precipitate was filtered, washed with water and dried under vacuum at 60° C. The product, a white solid (2.16 g; 93%), melted at 270°–272° C. The assigned structure was confirmed by nuclear magnetic resonance, infrared and mass spectrophotometric analytical techniques. Elemental analysis showed the following.

|     | Calculated | Found |
| --- | --- | --- |
| %C | 46.17 | 46.02 |
| H | 2.15 | 2.02 |
| F | 23.34 | 23.86 |

Part C—Preparation of 2-trifluoromethylterephaloyl chloride:

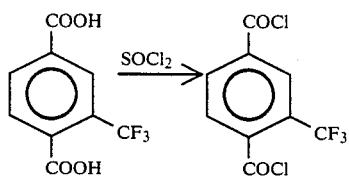

2-trifluoromethylterephthalic acid prepared in the manner described in Part B (4.50 g; $1.92 \times 10^{-2}$ mole) was refluxed in 20 mls. of thionyl chloride (plus one drop dimethylformamide) for four hours. The thionyl chloride was then distilled off and the reaction vessel was blown dry with nitrogen. The resulting yellow liquid was vacuum distilled in a short-path still at one mm Hg, between the temperature range of 90°–95° C., yielding 4.33 g (83%) of colorless product. NMR, IR and mass spectra confirmed the assigned structure. Elemental analysis provided the following.

|     | Calculated | Found |
| --- | --- | --- |
| % C | 39.89 | 40.08 |
| H | 1.12 | 1.24 |
| F | 21.03 | 20.88 |
| Cl | 26.16 | 26.45 |

EXAMPLE 2

This Example illustrates the polycondensation of 2-trifluoromethylterephthaloyl chloride and chlorohydroquinone:

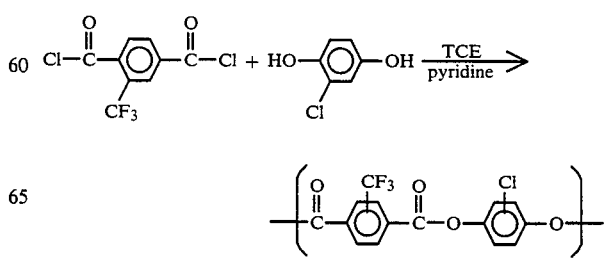

A solution of 2-trifluoromethylterephthaloyl chloride (271 mgs.) in two mls. of 1,1,2,2-tetrachloroethane (TCE) was added dropwise to a well-stirred solution of chlorohydroquinone (144.5 mgs.) in two mls. of TCE and 0.6 ml. of pyridine under argon. After stirring at room temperature for 18 hours, the polymer, which precipitated during the reaction, was stirred in 300 mls. of methanol, filtered and dried under vacuum. Yield was 325 mgs. (95%) of white polymer.

Inherent viscosity (0.79 dl./g.) was determined in p-chlorophenol/TCE (1/1) at 0.5 g./dl. and 30° C. The melting temperature of the polyester (127° C.) was determined by hot-stage microscopy using a heated sample positioned between crossed polarizers. The temperature at which anisotropy was observed was recorded as the melting temperature.

EXAMPLES 3 TO 5

Using the polycondensation method described in Example 2, other polyesters having repeating units as described hereinbefore and identified in Table 1 were prepared. Values reported in Table 1 for inherent viscosity and melting temperature were determined using the techniques described in EXAMPLE 2.

TABLE 1

| Example | Polyester (Formula #) | Inherent Viscosity (dl./g.) | Melting Temperature (°C.) |
|---|---|---|---|
| 3 | (VII) | 0.45 | 135 |
| 4 | (VIII) | 0.87 | 143 |
| 5 | (IX) | 0.85 | 170 |

From the date presented in Examples 2 to 5, it will be seen that the polyesters thereof exhibit relatively low melting temperatures. These melting temperatures (ranging from 127° C. to 170° C.) compare favorable with the melting temperatures reported in the literature for polyesters of the following structures:

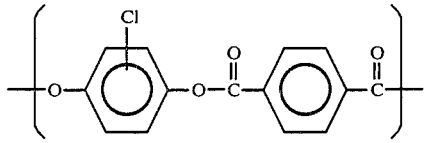

m.p. 340° C.; R. W. Lenz, J.-I. Jin, C. Ober and S. Antoun, Br. Poly. J., 12, 132 (1980)

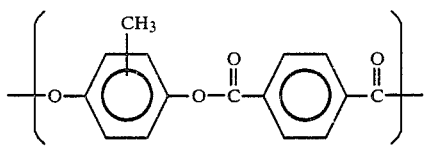

m.p. 371°; R. W. Lenz and J.-I. Jin. Mcromolecules 14, 1405 (1981)

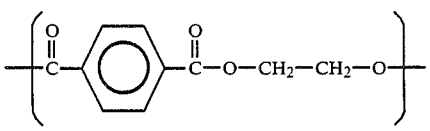

m.p. 267° C.; I. Kirshenbaum, J. Polym. Sci., A, 3 1869 (1965).

What is claimed is:

1. A melt-processable polyester comprising as essential units, repeating units of the formula

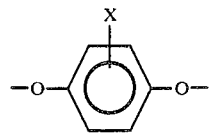

wherein X is hydrogen, halogen, alkyl or nitro, and repeating units of the formula

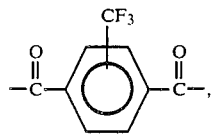

and as optional units, repeating units of the formula

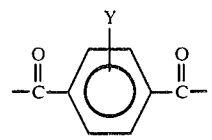

wherein Y is hydrogen, halogen, alkyl or nitro, and repeating units of the formula

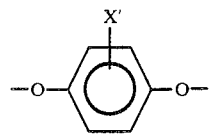

wherein X' is hydrogen, halogen, alkyl or nitro, except that X' is different from X.

2. The polyester of claim 1 consisting essentially of said repeating units of the formula

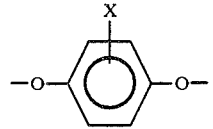

wherein X is hydrogen, halogen, alkyl or nitro and said repeating units of the formula

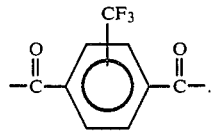

3. The polyester of claim 2 wherein X is chloro.
4. The polyester of claim 2 wherein X is methyl.
5. The polyester of claim 1 consisting essentially of said repeating units of the formula

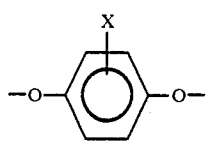

wherein X is hydrogen, halogen, alkyl or nitro, said repeating units of the formula

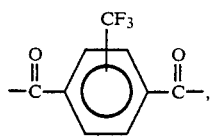

and said repeating units of the formula

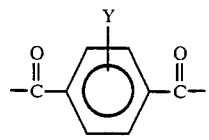

wherein Y is hydrogen, halogen, alkyl or nitro.

6. The polyester of claim 5 wherein X is chloro.

7. The polyester of claim 6 wherein Y is hydrogen.

8. The polyester of claim 5 wherein X is chloro and Y is methyl.

9. The polyester of claim 1 consisting essentially of said repeating units of the formula

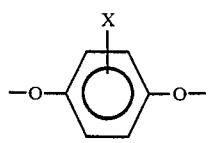

wherein X is hydrogen, halogen, alkyl or nitro, said repeating units of the formula

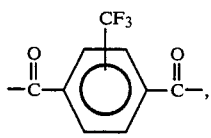

and said repeating uits of the formula

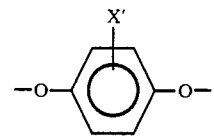

wherein X' is hydrogen, halogen, alkyl or nitro, except that X' is different from X.

10. The polyester of claim 9 wherein X is methyl.

11. The polyester of claim 10 wherein X' is chloro.

12. The polyester of claim 1 consisting essentially of said repeating units of the formula

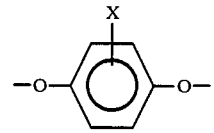

wherein X is hydrogen, halogen, alkyl or nitro, said repeating units of the formula

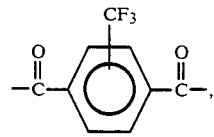

said repeating uits of the formula

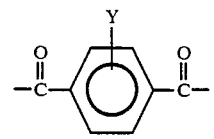

wherein Y is hydrogen, halogen, alkyl or nitro and said repeating units of the formula

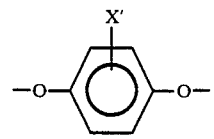

wherein X' is hydrogen, halogen, alkyl or nitro, except that X' is different from X.

13. The polyester of claim 12 wherein X is chloro, X' is hydrogen and Y is hydrogen.

14. The polyester of claim 7 wherein each of said repeating units is present in said polyester in molar proportions, respectively, of 0.5:0.25:0.25.

15. The polyester of claim 11 wherein each of said repeating units is present in said polyester in molar proportions, respectively, of 0.25:0.5:0.25.

16. The polyester of claim 13 wherein each of said repeating units is present in said polyester in molar proportions, respectively, of 0.25:0.25:0.25:0.25.

* * * * *